Figure 1:
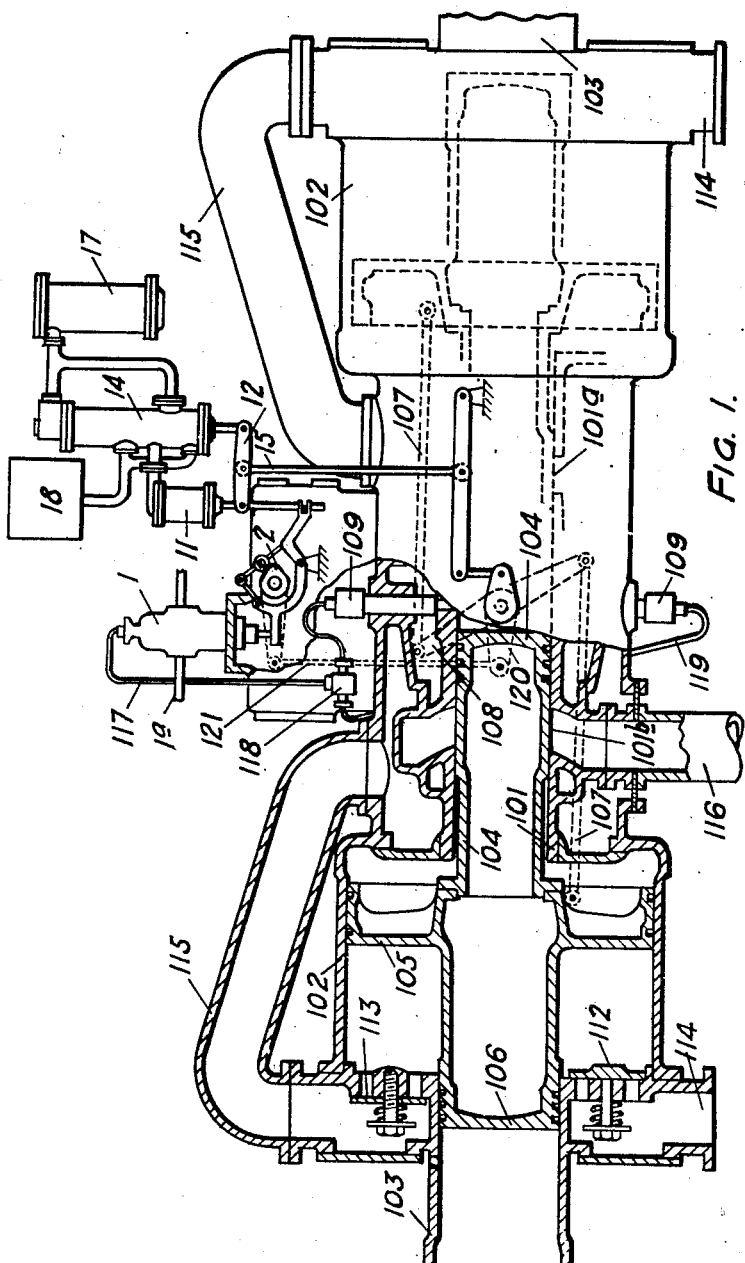

Aug. 29, 1950

R. J. WELSH 2,520,294

CONTROL OF FREE PISTON TYPE
INTERNAL-COMBUSTION ENGINES

Filed Oct. 14, 1947

2 Sheets-Sheet 1

INVENTOR:
ROBERT J. WELSH

BY *Babcock & Babcock*

ATTORNEYS

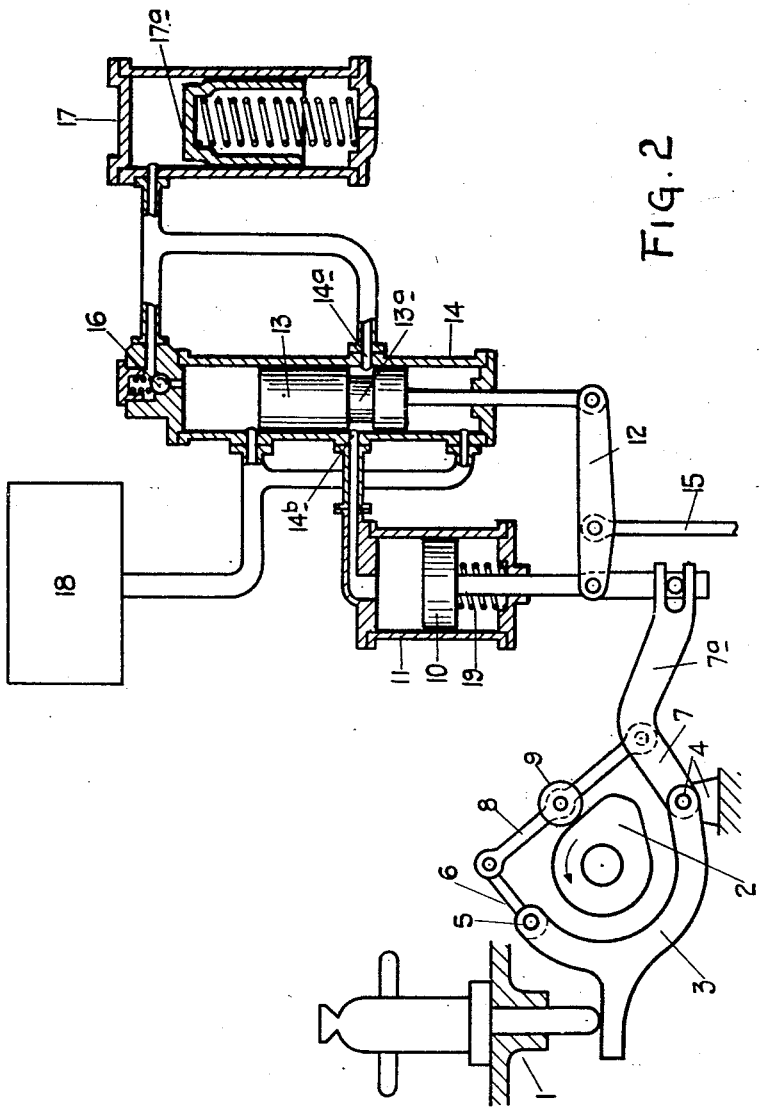

Patented Aug. 29, 1950

2,520,294

UNITED STATES PATENT OFFICE 2,520,294

CONTROL OF FREE PISTON TYPE INTERNAL-COMBUSTION ENGINES

Robert James Welsh, Rugby, England, assignor to The English Electric Company Limited, London, England, a British company Application October 14, 1947, Serial No. 779,798
In Great Britain October 12, 1942

Section 1, Public Law 690, August 8, 1946
Patent expires October 12, 1962

5 Claims. (Cl. 123—46)

This invention relates to a free piston type internal combustion compressor—i. e. a device wherein a compressor piston is directly connected to or combined with an internal combustion engine piston instead of being driven thereby through connecting rods, cranks and crankshafts. There are usually two opposed engine pistons reciprocable towards and away from each other in one cylinder; the engine is usually one operating on a two-stroke compression-ignition cycle, some or all of the air from the compressor serving to scavenge and charge the engine cylinder.

A device of this kind may be used as a gas generator to supply motive fluid to another piece of apparatus such as a gas turbine, which may have as its working fluid either (I) solely air coming direct from the compressor or (II) solely the exhaust from the engine cylinder (comprising the products of the combustion in the engine cylinder mixed with the scavenging air supplied to the engine by the compressor) or (III) a mixture of the engine exhaust with air coming direct from the compressor. The second of these three alternatives is most usual.

The stroke of the free piston of a gas generator as defined above is usually variable or at least the innermost point reached by the piston at the end of the compression of the charge in the engine cylinder (which may be called the inner dead centre) usually varies throughout operation. The pressure of the gas delivered by the gas generator has to vary during operation and more particularly where it is used to supply a prime mover such as a gas turbine the pressure has to vary throughout operation in accordance with variations in the load on the turbine.

According to the present invention the point in the piston stroke at which combustion is initiated during the movement of the free piston towards the inner dead centre is varied automatically substantially in accordance with the inner dead centre position reached by the piston at the end of the immediately preceding compression stroke. In the case of a gas generator of the compression-ignition fuel-injection type, the point in the stroke at which fuel injection commences is automatically varied—preferably by acting on the fuel injection pump arrangement to vary the point at which the operation of this pump commences.

In order to be better understood and readily carried into effect the invention is illustrated by way of example in the accompanying drawings of which Fig. 1 shows a typical free piston internal combustion engine compressor in elevation in part section, and Fig. 2 shows the mechanism according to the invention in section on a larger scale, this mechanism being indicated diagrammatically only in Fig. 1.

Referring first to Fig. 1, the free piston internal combustion engine compressor comprises a combustion cylinder 101, a pair of compressor cylinders 102 and a pair of cushion cylinders 103 arranged in alignment with the combustion cylinder on either side of it, and a pair of free piston assemblies each consisting of an engine piston 104, a compressor piston 105 and a cushion piston 106 adapted to perform opposite reciprocating movements in the said cylinders, being linked by links 107 to a two-armed lever 108 pivoted on the engine body.

Air enters the compressor cylinders 102 through the air inlets 114 and inlet valves 112 and leaves them through outlet valves 113 and transfer ducts 115. The compressed air enters the combustion cylinder 101 as soon as the scavenging ports 101a are cleared by the one of the engine pistons 104, and the combustion products and scavenging air leaves the combustion cylinder 101 as soon as the exhaust ports 101b are cleared by the other engine piston 104, via the exhaust pipe 116 leading to a gas turbine (not shown).

Fuel is injected into the combustion cylinder 101 by a fuel pump 1 having the usual fuel control rack 1a, via the pipe 117, the conventional fuel distributor 118 and pipes 119, leading to the fuel injector nozzles 109. The fuel pump 1 is operated in a manner to be described more in detail with reference to Fig. 2, by a cam 2, which is angularly reciprocated by the free piston assemblies by being linked to them by means of the links 107, the two armed lever 108, the lever 120 and the link 121.

The reciprocating movement of the free piston assemblies is transmitted also to the lever 12 through link 15 and any suitable link and lever mechanism coupled to the two armed lever 108 as diagrammatically indicated in Fig. 1.

In the particular mechanism shown in Fig. 2, the fuel injection pump 1 is reciprocated by a follower bearing on the cam 2 (the fuel-cam) oscillated by a free piston unit, which cam itself may be angularly movable with respect to the means by which it is driven from the free piston, but preferably, as shown, the cam follower is angularly movable substantially around the centre of oscillation of the cam; a lever 3 for actuating the pump 1 is mounted on the pivot 4 on one side of the cam 2 and carries a pivot pin 5 on the other side of the cam shaft, the centre lines of the axes of the cam 2 and of the pivot pins 4 and 5 lying on a straight line when the fuel pump is not in motion. A pair of equal cranks 6 and 7 carried respectively by the pivot pins 5 and 4 and having their free ends pivotally connected by a link 8 form a parallel link motion. The cam follower is a roller 9 mounted at such a point on link 8 that on movement of links 6, 7 and 8 relatively to lever 3 the motion of roller 9 is in an arc substantially about the axis of cam 2, the roller 9 riding on the base circle of the cam 2. An extension 7a of crank 7 is connected to the servo-motor piston 10 reciprocable in cylinder 11 and can thereby be rotated to different angular positions to move the roller 9 to various positions angularly around the fuel cam 2.

The lever 12 is linked at one end to the piston 10 and at the other end to a control piston 13 reciprocable in a control cylinder 14. An intermediate point on the lever 12 can be reciprocated, through link 15, by the free piston unit during its stroke or at least during the last part of its compression stroke in the engine cylinder, thereby rocking the lever 12 about its pivotal point of attachment to the piston 10 to drive the control piston 13 inward. The latter then tends to force fluid—usually liquid—out of the cylinder 14 through a non-return valve 16 into an accumulator 17—which latter is shown as a cylinder 17 wherein liquid is stored under pressure produced by the spring-loaded piston 17a but which can be any elastically deformable chamber such as one of bellows-like form or even a distensible elastic bag. The cylinder 14 has each end in communication with a storage reservoir 18 which keeps the cylinder 14 filled and it also has two ports 14a and 14b located relatively as shown. The piston 13 has an annular groove 13a. Normally—i. e. when the piston 10 is in its correct position having regard to the inner dead centre position reached by the free piston unit the piston 13 will end its in-stroke in such a position that its lower edge uncovers port 14a without uncovering port 14b whereby the liquid pumped into accumulator 17 will return to cylinder 14 through port 14a and no motion of piston 10 takes place. If the free piston in-stroke increases the lower edge of the piston 13 will uncover port 14b and allow liquid to flow through this port to cylinder 14 from cylinder 11 whereby the biasing spring 19 can move piston 10 in the same direction as piston 13 until piston 10 is in a position corresponding to the new free-piston inner dead centre position. Similarly if the free-piston in-stroke decreases, the piston will not move inwards far enough for its lower edge to uncover port 14a and allow liquid to return to cylinder 14 from accumulator 17; hence when, on return movement of piston 13, the groove 13a puts port 14a in communication with port 14b liquid can flow from the accumulator 17 into cylinder 11 and move piston 10— against the force of spring 19 and in the opposite direction from before—to bring this piston 10 again into a position corresponding to the free-piston inner dead centre. Since member 15 and piston 10 act differentially through lever 12 on piston 13 the latter can only make a normal stroke—and leave piston 10 at rest—so long as piston 10 is substantially in a position corresponding to the free-piston dead centre—i. e. on each compression stroke of the free-piston unit the piston 10 will be in a position substantially corresponding to the inner dead centre position reached at the end of the immediately preceding compression stroke.

The movement of piston 10 in response to an increase in the free-piston in-stroke will rock the links 6, 7 and 8 about the lever 3 in a sense to move the follower 9 around the cam 2 in the direction of motion of this cam, whereby the follower is engaged later by the projecting part of the cam and the initiation of fuel injection is delayed. An opposite movement of piston 10 in response to a decrease in the in-stroke will move the follower around the cam in the opposite direction, to advance the initiation of fuel injection.

As the free-piston unit reciprocates, the cam 2 oscillates; as the unit approaches the inner dead centre the cam—at a point dependent on the angular position to which the follower has been moved around the cam—drives the follower 9 thereby bodily moving the follower, the link motion and the lever 3 to actuate the fuel pump 1. This movement and hence the stroke of pump 1 is determined by the dimensions of the cam 2 and is substantially independent of the varying timing of the starting of the pump operation.

It will be understood that the foregoing is given merely as an example of one method of carrying out the invention and that any various alternative mechanical devices could be used.

What I claim as my invention and desire to secure by Letters Patent is:

1. A free piston internal combustion engine compressor comprising a combustion cylinder, and at least one compressor cylinder; at least one engine piston and at least one compressor piston, the said pistons being adapted to reciprocate together as a free piston assembly in the said cylinders at a variable length of stroke, fuel supply means to said engine cylinder, timing means operated by the said reciprocating free piston assembly adapted to initiate the combustion of the fuel supplied to the said combustion cylinder, means responsive to the length of the engine compression stroke of the said free piston assembly, and automatic means operatively connecting the said combustion initiating means with the said stroke responsive means in a sense of varying the point on the compression stroke at which combustion is initiated substantially in accordance with the inner dead centre position reached by the free piston assembly at the end of the immediately preceding engine compression stroke.

2. A free piston internal combustion engine compressor as claimed in claim 1 operating on the compression-ignition principle including a fuel pump and fuel injector nozzle as the fuel supply means to the combustion cylinder, a timing gear for said fuel pump as the timing means adapted to initiate the combustion of the fuel supplied to the combustion cylinder, and in which the said stroke responsive means control the said timing gear.

3. A free piston internal combustion engine compressor as claimed in claim 1 including following up means adapted to control periodically the position of said timing means for initiating the combustion of the fuel in accordance with the inner dead centre position reached by the free piston assembly and to move the said timing means in accordance with the variations in position of the said inner dead centre positions so as to alter thereby the timing of the subsequent initiation of combustion.

4. A free piston internal combustion engine compressor operating on the compression ignition principle, comprising a combustion cylinder and at least one compressor cylinder, at least one engine piston and at least one compressor piston, the said pistons being adapted to reciprocate together as a free piston assembly in the said cylinders at a variable length of stroke, a fuel injection pump adapted to supply fuel to said engine cylinder, timing means for initiating the combustion of the fuel including a cam oscillated by the reciprocating free piston assembly and a cam follower adapted to operate the said fuel injection pump, following-up means adapted to control periodically the position of said timing means in accordance with the inner dead centre position reached by the free piston assembly and to move the said timing means in accordance with the variations in position of the said inner dead centre positions so as to alter thereby the timing of the subsequent initiation of combustion by varying the relative angular position of the said cam and the said follower, means responsive to the length of the engine compression stroke of the said free piston assembly, and automatic means operatively connecting the said timing means with the said stroke responsive means in a sense of varying the point on the compression stroke at which combustion is initiated substantially in accordance with the inner dead centre position reached by the free piston assembly at the end of the immediately preceding engine compression stroke.

5. A free piston internal combustion engine compressor as claimed in claim 4 including as follow-up means a cylinder adapted to be connected to fluid pressure, a piston adapted to move in said cylinder under fluid pressure, a spring biassing the said piston against the fluid pressure, a fluid pump differentially actuated by the said piston and the free piston assembly in accordance with the inner dead centre position of the latter, and said pump being adapted to control the flow of fluid to and from the said cylinder.

ROBERT JAMES WELSH.

REFERENCES CITED

The following references are of record in the file of this patent:

UNITED STATES PATENTS

| Number | Name | Date |
|---|---|---|
| 2,084,823 | Pateras-Pescara | June 22, 1937 |
| 2,132,083 | Pateras-Pescara | Oct. 4, 1938 |
| 2,182,063 | Steiner | Dec. 5, 1939 |

FOREIGN PATENTS

| Number | Country | Date |
|---|---|---|
| 509,111 | Great Britain | of 1939 |
| 794,632 | France | of 1936 |
| 865,164 | France | of 1941 |